United States Patent [19]
Leverenz

[11] Patent Number: 4,603,033
[45] Date of Patent: Jul. 29, 1986

[54] SALT HARVESTER FOR HARVESTING SALT IN ELONGATED SOLAR SALT CRYSTALLIZER

[75] Inventor: Melvin E. Leverenz, St. Clair, Mich.

[73] Assignee: Diamond Crystal Salt Company, St. Clair, Mich.

[21] Appl. No.: 685,754

[22] Filed: Dec. 24, 1984

[51] Int. Cl.$^4$ .............................................. B01D 9/02
[52] U.S. Cl. ................................. 422/245; 23/295 S; 23/298; 422/268; 422/287
[58] Field of Search .................. 23/295 R, 295 S, 296, 23/298, 302 R, 302 A, 302 T, 303, 304; 422/243, 245, 246, 268, 286, 287; 159/1 S, 1 G

[56] References Cited
U.S. PATENT DOCUMENTS
1,900,247 3/1933 Martin ................................... 23/303

OTHER PUBLICATIONS

Fourth Symposium on Salt, vol. 2; Northern Ohio Geological Society; 1974; pp. 407–408 and 411.
Bull. 175; "Salt in California", Dept. of Natural Resources; Div. of Mines, Ferry Bldg., San Francisco; 1957; pp. 52–55; 62–65; 77–78.

Second Symposium on Salt; Northern Ohio Geological Society, Inc.; 1966; pp. 146 & 185.

Primary Examiner—Frank Sever
Attorney, Agent, or Firm—Harness, Dickey & Pierce

[57] ABSTRACT

An improved harvester for harvesting a salt crop from the bottom of a shallow, elongated solar crystallizer containing a substantially saturated salt solution overlying the salt crop. The harvester includes track means extending longitudinally along the sides of the crystallizer on which a pair of carriages are movably mounted and support the ends of a frame extending transversely across the crystallizer. The frame includes salt gathering means for transferring the salt crop laterally in the form of one or a plurality of longitudinally extending furrows or ridges in response to the travel of the harvester along the tracks and the resultant gathered salt is extracted by one or a plurality of suction inlets disposed in alignment with the furrows in the form of an aqueous brine slurry. The extracted salt crop is subsequently separated and recovered while the liquid brine is returned to the crystallizer. The harvester enables the harvesting of a solar salt crop while retaining a protective layer of substantially saturated brine over the salt crop while simultaneously maintaining a salt floor or bottom in the crystallizer of a preselected thickness.

9 Claims, 5 Drawing Figures

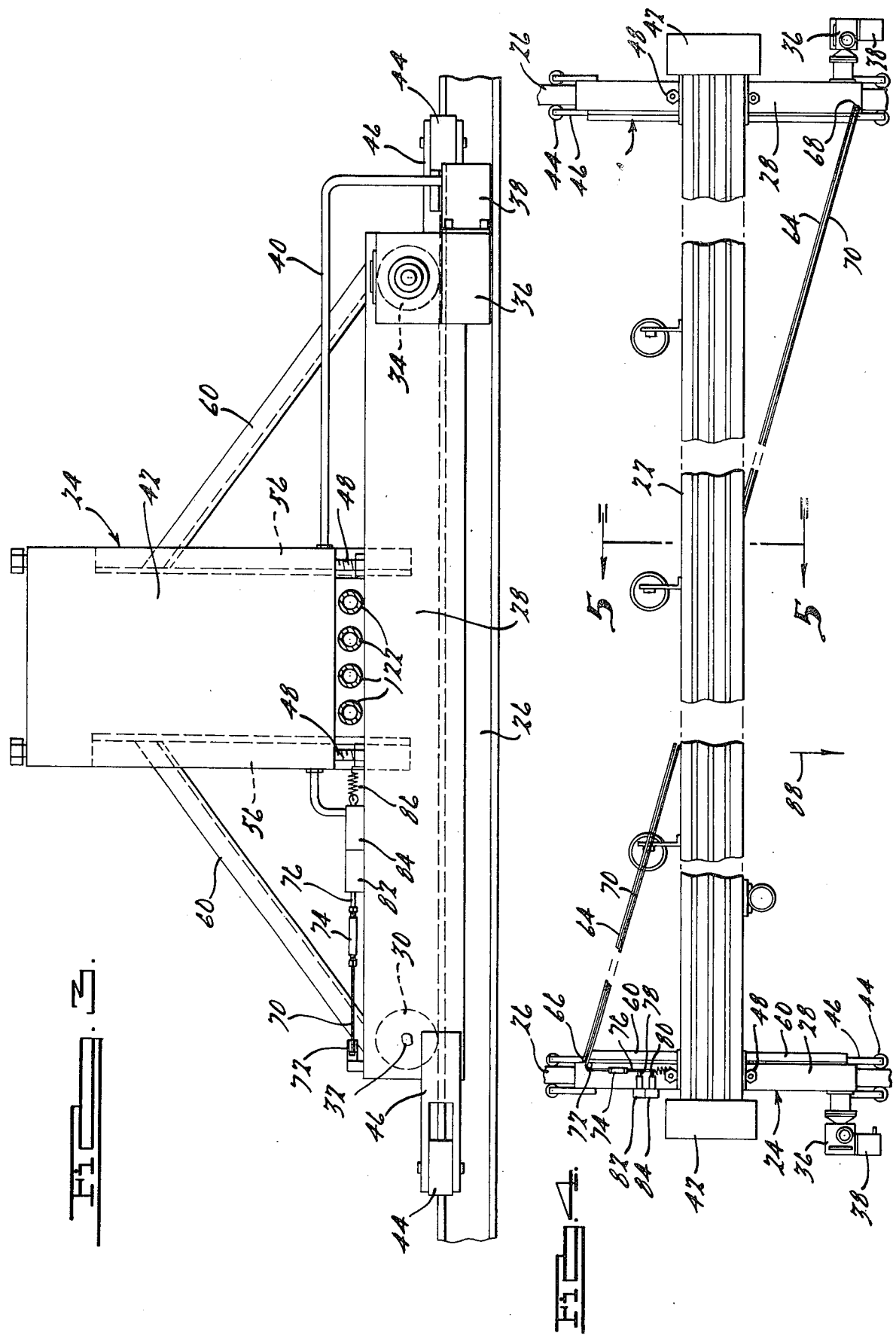

SALT HARVESTER FOR HARVESTING SALT IN ELONGATED SOLAR SALT CRYSTALLIZER

BACKGROUND OF THE INVENTION

The production of solar salt from seawater by evaporation through solar action is well known and in widespread commercial use. Conventionally, such solar salt installations comprise a series of open ponds into which seawater is introduced and the concentration of the salt in the brine progressively increases toward the last pond, called the crystallizer, in which sodium chloride crystals are recovered. After several months of operation, the salt crop in the last crystallizer pond increases to a desired depth whereby the brine is drained from the pond and heavy equipment such as earth movers or the like are employed for scraping and removing the solid salt crop. The use of such heavy equipment and the scraping action along the floor or bottom of the pond invariably results in a contamination of the salt crop with sand, earth and clay defining the bottom of the pond structure necessitating subsequent purification of the harvested crop prior to use. A further disadvantage associated with such prior art conventional harvesting techniques has been the necessity of draining the protective overlying brine layer from the pond exposing the salt crop to precipitation which has resulted in some instances, with a loss of all or substantial portions of the crop due to redissolution thereof as a result of heavy rainfalls.

The present invention is directed to an improved salt harvester for harvesting a salt crop from a solar crystallizer in a manner whereby the salt crop is continuously protected by an overlying brine layer and wherein the harvesting is effected so as to retain a residual salt floor over the bottom of the crystallizer and avoiding contamination of the harvested salt crop with earth, sand and clay of which the crystallizer is constructed. The present invention is particularly applicable for the harvesting of salt crops from solar crystallizers of the types described in copending U.S. patent application Ser. No. 622,475, filed June 20, 1984 by John F. Heiss and Melvin E. Leverenz and entitled "Solar Salt Crystallizer and Process for Producing Salt", now U.S. Pat. No. 4,564,367, granted Jan. 14, 1986, which is assigned to the assignee of the present invention. The teachings as set forth in the aforementioned copending application are incorporated herein by reference to facilitate a further understanding of the present invention.

SUMMARY OF THE INVENTION

Broadly stated, the present invention comprises a salt harvester for harvesting the salt crop from the bottom of a shallow elongated generally rectangular salt crystallizer containing a salt solution overlying the salt crop. The salt harvester comprises track means extending longitudinally along opposite sides of the crystallizer, a frame movably supported on the track and extending transversely above the crystallizer, drive means for moving the frame along the track from one end of the crystallizer to the other, a salt gathering means positioned on the frame and disposed adjacent to the salt crop for engaging and laterally transferring the salt crop into a plurality of longitudinally extending furrows in response to the longitudinal travel of the frame, power means for driving the gathering means, pumping means provided with a plurality of suction inlets positioned on the frame immersed in the salt solution and disposed in alignment above the furrows for withdrawing the gathered salt crop in the form of a slurry, and a separating means for separating the solid salt crop from the slurry and returning the salt solution to the crystallizer. The separating means transfers the collected solid salt crop to a salt drying means where the salt is dried and after the drying process is collected.

An object of the present invention is to provide an improved salt harvester and process for harvesting salt from solar salt crystallizers without requiring a draining of the protective overlying brine layer or a destruction of the salt crystallizer structure.

Other objects and advantages of the present invention will become apparent upon a reading of the Description of the Preferred Embodiments taken in conjunction with the accompanying drawings and the appended claims.

BRIEF DESCRIPTION OF THE DRAWINGS

FIG. 3 is a magnified end elevational view of one end of the salt harvester shown in FIG. 1;

FIG. 4 is a fragmentary plan view of the salt harvester illustrating a mechanism for maintaining the harvester substantially perpendicular to its direction of travel.

DESCRIPTION OF THE PREFERRED EMBODIMENTS

Figure 1:
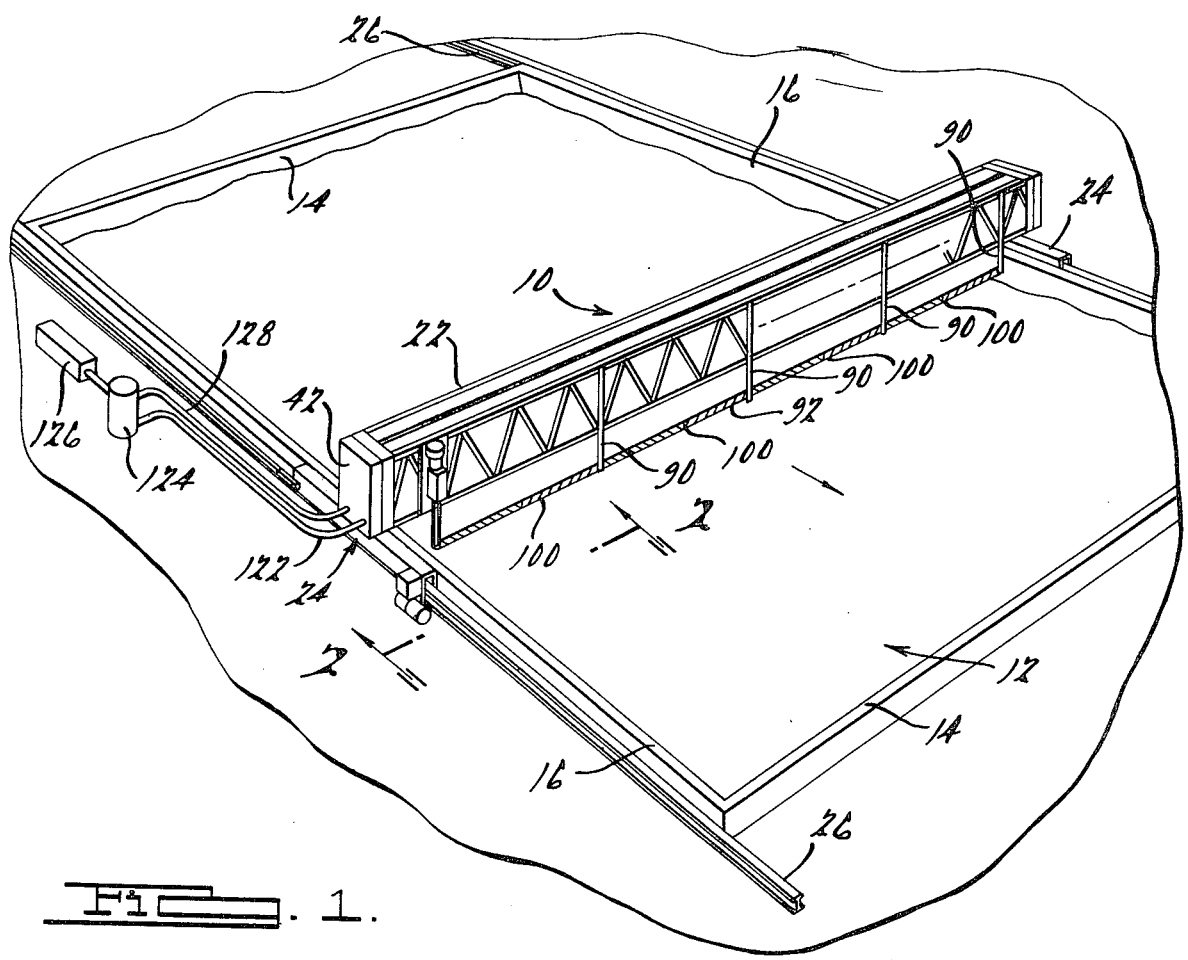
FIG. 1 is a perspective view of a salt harvester constructed in accordance with a preferred embodiment of a present invention disposed above a solar salt crystallizer.

Referring now in detail to the drawings and as may be best seen in FIG. 1, a salt harvester 10 is illustrated positioned transversely across an elongated generally rectangular solar salt crystallizer indicated at 12. The solar crystallizer 12 is defined by a structure preferably including an earth berm extending around the periphery thereof including a pair of inwardly sloping end walls 14 and longitudinally extending side walls 16. The interior of the crystallizer is filled with a substantially saturated brine solution indicated at 18 in FIG. 2 which overlies a salt crop over the bottom of the crystallizer including a residual salt floor 20 on which a particulated crop of salt produced in adapted to be disposed. During normal operation of the solar crystallizer as described in the aforementioned U.S. copending patent application Ser. No. 622,475, saturated brine solution is introduced into the crystallizer through conduits (not shown) disposed adjacent to the stratum of brine immediately above the salt floor while unsaturated brine is removed from the upper stratum of the overlying brine layer through skimming conduits (not shown) in a manner to effect a resaturation thereof and a return to the crystallizer. In accordance with the foregoing operation and as more fully described in the aforementioned copending application, the brine solution in the crystallizer is maintained substantially saturated in spite of occasional precipitation whereby salt is produced as a result of evaporation and solar heating effecting crystal growth and precipitation thereof on the upper surface of the salt floor 20. Periodically, the accumulation of the precipitated salt crop is removed by the harvester comprising the present invention without any interruption in the operation of the solar crystallizer.

The salt harvester 10 comprises a transverse frame 22 of a truss-type construction having the ends thereof adjustably supported on carriages 24 which are movably mounted on guide means such as tracks 26 extending longitudinally and outwardly of the side wall 16 of the solar crystallizer. Each carriage 24 is of substantially identical construction and a detailed description of only one is therefore necessary for a complete understanding of the present invention.

Figure 2:
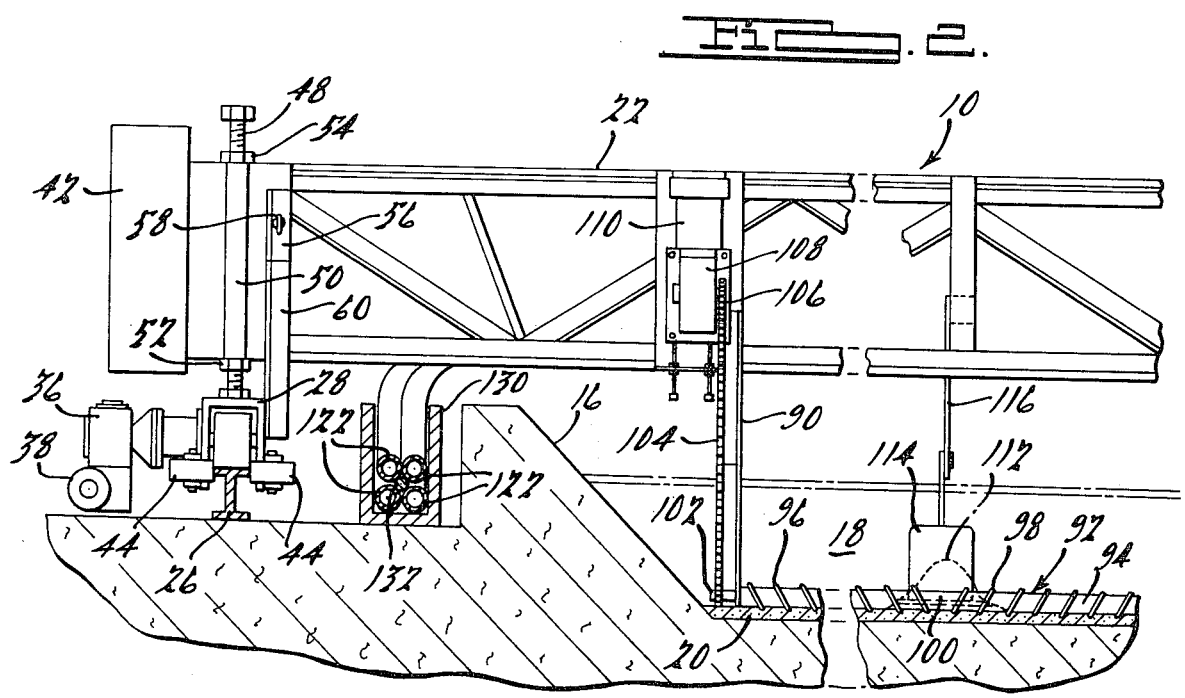
FIG. 2 is a fragmentary enlarged elevational view partly in section of one end of the salt harvester and crystallizer shown in FIG. 1 and taken along the line 2—2 thereof.

The carriage 24 as best seen in FIGS. 2-4 comprises a base 28 of a generally inverted U-shaped configuration having an idler wheel 30 rotatably supported by a shaft 32 affixed to the depending flanges thereof and disposed in rolling bearing contact with the upper surface of the track 26. At the opposite end of the base 28, a driven wheel 34 is drivingly coupled to a shaft of a gear reducer 36 which in turn is drivingly coupled to an electric drive motor 38. Energization of the drive motor 38 is effected through an electrical conduit 40 as best shown in FIG. 3 which is connected to a control box 42 mounted on each of the carriages 24. The idler wheel 30 and driven wheel 34 may suitably be comprised of any hard material, preferably a high tensile reinforced plastic material or a reinforced hard rubber material.

Longitudinal alignment of the idler wheel 30 and driven wheel 34 on the upper surface of the track 26 is facilitated by pairs of guide wheels 44 mounted on longitudinally extending brackets 46 affixed to the outer depending flanges of the base 28 as best seen in FIGS. 2 and 3. The periphery of the guide wheels 44 are adapted to be disposed in rolling bearing contact against the upper side edges of the track 26.

Each end of the transverse frame 22 is mounted for vertical adjustment on the carriage 24 by means of a pair of longitudinally spaced vertically disposed threaded supports 48 which extend through tubular members 50 affixed to the end portion of the transverse frame as best seen in FIG. 2. A lower supporting nut 52 and an upper locking nut 54 are threadably secured on each threaded support for engaging the lower end and upper end, respectively, of the tubular members 50. By appropriate adjustment of the supporting nut 52 and locking nut 54, the vertical disposition of the transverse frame relative to the upper surfaces of the tracks 26 and the upper surface of the salt floor 20 in the solar crystallizer can be effected to provide accurate disposition of the mechanical harvesting device on the frame as subsequently more fully described. Further rigidification of the ends of the frame to the carriages is achieved by a pair of upright angle iron members 56 rigidly secured to the inner surface of the depending flange of the base 20 having the upper ends thereof slotted as indicated at 58 in FIG. 2 for securely fastening the carriage to the frame end after appropriate adjustment has been attained. The upright members 56 are further braced by angular braces 60 as best seen in FIG. 3.

In accordance with the foregoing arrangement, the harvester including the end carriages and transverse frame are adapted to be advanced longitudinally along the tracks 26 at a controlled speed during a harvesting operation to effect the harvesting of a predetermined crop of salt on the salt floor of the crystallizer. In accordance with a preferred embodiment of the present invention, the individual drive mechanism on each of the carriages is coordinated so as to effect a controlled travel of the harvester in a manner to maintain the transverse frame 22 thereof in a position substantially perpendicular to the direction of travel. In accordance with the illustrated embodiment, independent energization and deenergization of the electric drive motors and the driven wheels 34 connected thereto is achieved by a squaring mechanism as may be best seen in FIGS. 3 and 4. The squaring mechanism comprises a substantially inextensible flexible cable including a first flight 64 having its end securely anchored to the left hand carriage base as viewed in FIG. 4 by means of a pin 66. The first flight of the flexible cable extends diagonally and is trained around a pulley 68 affixed to the upper surface of the base 28 of the right hand carriage whereafter the cable is trained as a second flight 70 in a direction substantially parallel to the first flight 64. The second flight 70 is trained around a pulley 72 on the left hand carriage as viewed in FIG. 4 and as more clearly shown in FIG. 3 and is connected to a turnbuckle 74 for adjusting the length and tension thereof. The opposite end of the turnbuckle is connected to an acutating rod or chain 76 to which a finger 78 of position limit switch 82 and a finger 80 of safety switch 84 are secured. The opposite end of the actuating rod or chain 76 is secured to biasing means such as a spring 86 affixed to the carriage for applying a preselected tension to the flexible cable.

The position limit switch 82 is of a conventional type which upon deflection of the finger thereon beyond a preselected angularity such as about five degrees in each direction from the perpendicular position shown in FIG. 4 is operative to open and deenergize one of the electric drive motors through an electrical circuit in the control boxes 42 on each of the carriages.

In accordance with the foregoing arrangement, and with the harvester shown in FIG. 4 moving in a direction as indicated by the arrow 88 a skewing of the transverse frame 22 is detected by an elongation or a reduction in the length of the first and second flights of the flexible cable effecting a corresponding longitudinal movement of the actuator rod or chain 76 and a corresponding actuation of the finger 78 on the limit position switch 82. Under a condition in which the right hand carriage 24 as viewed in FIG. 4 advances to a position ahead of the left hand carriage 24, a progressive elongation and resilient displacement of the flexible cable occurs causing an angular displacement of the finger 78 on the position switch 82 beyond a preset angularity thereby effecting a deenergization of the drive motor 38 on the right hand carriage while a continued energization of the motor 38 on the left hand carriage is maintained whereby the left hand carriage continues to advance until the actuator returns to a normal position at which time the right hand motor 38 is again energized causing uniform advancement of the harvester along the tracks 26. Conversely, if the left hand carriage 24 as viewed in FIG. 4 advances ahead of the right hand carriage 24, this skewed condition is evidenced by a reduction in the length of the flexible cable causing movement of the actuator or chain 76 effecting a tripping of the finger 78 of the position limit switch 82 beyond the preset angularity in the opposite direction thereby effecting a deenergization of the motor 38 on the left hand carriage while maintaining the motor 38 on the right hand carriage energized. The deenergization of the drive means on the left hand carriage continues until the right hand carriage resumes a position in which the frame 22 is substantially perpendicular to the direction of travel of the harvester at which point the position limit switch 82 is again activated effecting a reenergization of the drive mechanism on the left hand carriage causing uniform advancing movement of the harvester.

The safety switch 84 is provided as a safeguard to effect a deenergization of both drive motors in the event of any breakage in the cable of the squaring mechanism or in the event an excessive skewed condition occurs which has not been satisfactorily remedied by the selected alternative energization and/or deenergization of the drive mechanisms. This is readily accomplished by placing the safety switch 84 in series with the limit position switch 82 and presetting the angularity of deflection of the finger 80 at an angle of actuation greater than the angle of actuation of the finger 78 on the switch 82 or connecting the finger 80 to the actuator rod or chain 76 through a suitable lost-motion connection.

The harvester is provided with means adapted to be submerged beneath the liquid brine in the crystallizer for gathering the salt in the form of a series of longitudinally extending furrows or ridges in which form the gathered salt crop is removed through suction means in the form of a particulated slurry. The salt gathering mechanism may comprise a bucket-type conveyor supported beneath the transverse frame 22 in alternating fashion for laterally transferring the salt crop toward a central position at spaced intervals along the width of the solar crystallizer. Alternatively and preferably, the salt collecting mechanism comprises an auger formed with left hand and right hand helical blades along alternating sections thereof which in response to rotation thereof is adapted to laterally transfer the salt in a series of longitudinally extending furrows along the salt floor. More specifically and as may be best seen in FIGS. 1 and 2, the transverse frame 22 is provided along the leading side thereof with a plurality of transversely spaced depending members 90 formed with journals in the lower end portions thereof for rotatably supporting a continuous tubular auger 92 in substantially horizontal supported relationship. As best shown in FIG. 2, the auger 92 comprises a tubular housing 94 on which a left hand helical cutting flight 96 and a right hand helical cutting flight 98 are affixed which merged together at each section thereof in the form of a plurality of transversely spaced gathering points 100. The central gathering points 100 are preferably arranged so as to correspond to substantially the mid point between the depending support members 90 as shown in FIG. 1. Rotation of the auger 92 in the desired direction is effected by a sprocket 102 affixed to the end of the auger around which a drive chain 104 is trained and is drivingly connected to a driven sprocket 106 connected on the output shaft of a gear reducer 108 coupled to a drive motor 110. Energization of the drive motor 110 effects rotation of the auger 92 causing a scraping and lateral transfer of the salt crop on the salt floor 20 into a furrow such as indicated in phantom at 112 in FIG. 2 at substantially the central gathering point 100 of each auger section.

Figure 5:
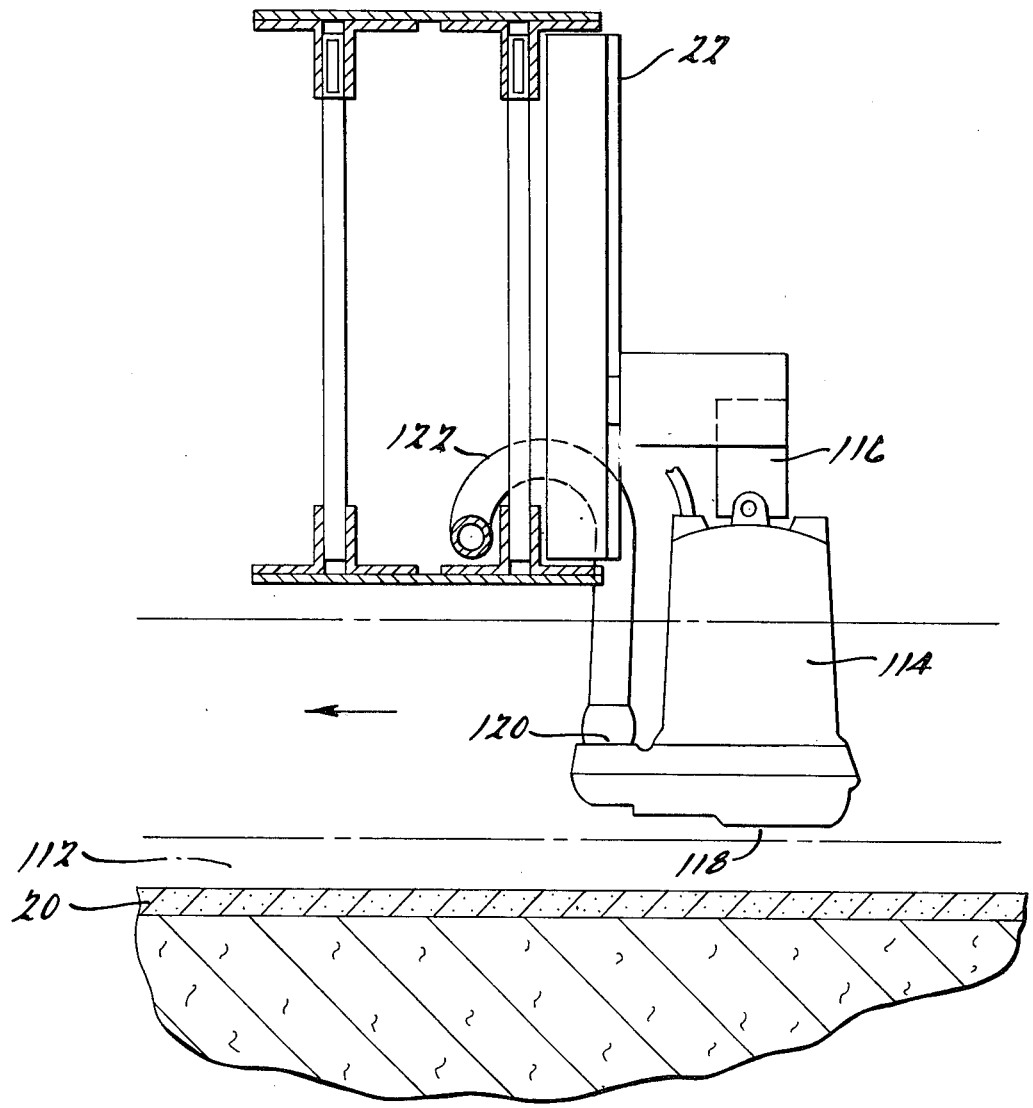
FIG. 5 is a magnified vertical transverse sectional view through the harvester shown in FIG. 4 and taken substantially along the line 5—5 thereof.

The gathered salt crop in each furrow or ridge 112 is subsequently removed from the solar crystallizer by means of a suction inlet disposed substantially above and in alignment with the furrow and submerged below the level of brine in the crystallizer. In accordance with a preferred embodiment of the present invention, individual submersible pumps 114 are employed as best shown in FIG. 5 which are affixed to the trailing side of the transverse frame 22 by means of L-shaped brackets 116. In the specific arrangement illustrated four submersible pumps 114 are adapted to be secured to the transverse frame for extracting the salt crop gathered in the form of four longitudinally extending ridges.

As shown in FIG. 5, the inlet or suction side 118 is disposed immediately above the furrow or ridge 112 of gathered salt and is adapted to withdraw the solid salt crop in the form of an aqueous brine slurry through a discharge port 120 connected to a flexible conduit 122. Each of the flexible conduits 122 connected to the individual submersible pumps 114 extend longitudinally along the bed of the transverse frame 22 and are disposed, as best seen in FIG. 3, for connection to a separating device (not shown) mounted on one end carriage, or alternatively, are adapted to extend along the side of a track 26 as shown in FIG. 1 for transfer to a separator 124 schematically illustrated therein. The separated solid harvested salt crop is transferred to a dryer 126 in which the moisture content thereof is reduced to a desired level whereafter the recovered salt can be further treated, purified or packaged as may be desired. The separated brine is returned from the separator 124 through a return line 128 back to the crystallizer so as to retain the level of brine therein at an appropriate position.

In accordance with a preferred embodiment, a U-shaped trough 130 as shown in FIG. 2 is disposed in longitudinally extending relationship between the side wall 16 and the track 26 within which flexible conduits 122 are removably and guidably disposed and are connected at their ends to the separator 124 as shown in FIG. 1. The four conduits 122 are preferably nested around a flexible electrical power cord 132 for supplying electrical power to the harvester.

In operation, a harvesting of a deposited salt crop is initiated by positioning the harvester 10 adjacent to one of the end walls 14 of the solar crystallizer 12. Through a control circuit in the control boxes 42, energization of the electric drive motors 38 on each carriage is initiated with simultaneous energization of the drive motor 110 for effecting rotation of the auger as well as energization of the submersible pumps 114. The harvester advances at a controlled rate along the tracks from one end wall 14 to the opposite end wall thereof and is maintained substantially perpendicular to its direction of travel by means of the squaring mechanism as hereinbefore described. Upon completion of the traversing movement, the auger drive mechanism and submersible pumps are deenergized and the end sections of the tracks 26 may be appropriately angled so as to effect upward movement of the harvester to a position wherein the auger and submersible pumps clear the upper edge of the adjacent end wall 14. It is also contemplated that instead of angularly inclining the end track sections, each carriage can be provided with a fluid actuated lift cylinder for elevating the transverse frame 22 to a clearance position above the upper edge of the end wall of the solar crystallizer. It is further contemplated that the tracks 26 can be disposed in alignment with a second or succeeding solar crystallizers whereby successive harvesting of a series of solar crystallizers can be effected in appropriate sequence.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A salt harvester for harvesting a salt crop from the bottom of a shallow elongated solar salt crystallizer containing a salt solution overlying the salt crop disposed on a residual salt floor, said harvester comprising track means extending longitudinally along the sides of the crystallizer, a frame movably supported on said track means and extending transversely above the crystallizer, drive means for moving said frame along said track means from one end to the opposite end thereof, salt gathering means on said frame disposed adjacent to the salt crop for engaging and laterally transferring the salt crop into a plurality of longitudinally extending furrows in response to longitudinal travel of said frame, power means for driving said gathering means, pumping means having a plurality of suction inlets immersed in the salt solution and disposed in alignment with the furrows for withdrawing substantially only the gathered salt crop in the form of an aqueous brine slurry while maintaining an overlying brine layer sufficient to preclude salt crop loss due to precipitation and separating means for separating the solid salt crop from the slurry and for returning the salt solution to the crystallizer.

2. The harvester as defined in claim 1 in which said track means comprises a plurality of rails extending longitudinally along the crystallizer in substantially parallel relation.

3. The harvester as defined in claim 1 in which said frame is movably supported by a pair of transversely spaced carriages supported on said track means.

4. The harvester as defined in claim 3 in which each of said carriages has an independently energizable drive means.

5. The harvester as defined in claim 4 further including squaring means associated with said independently energizable drive means for maintaining said frame substantially perpendicular to the direction of travel of said harvester.

6. The harvester as defined in claim 5 in which said squaring means comprises substantially inextensible means diagonally mounted on and extending between said carriages, and sensing means associated with said inextensible means for sensing a skewing of said frame for selectively energizing and deenergizing said independently energizable drive means.

7. The harvester as defined in claim 1 in which said salt gathering means comprises an auger having a plurality of right-handed and left-handed helical cutting flights for transversely gathering the salt crop in the form of a longitudinally extending furrow.

8. The harvester as defined in claim 7 in which said power means comprises a drive chain drivingly coupled to said auger.

9. The harvester as defined in claim 1 in which said pumping means comprises a plurality of submersible slurry pumps supported on said frame at a position in alignment with the furrows.

* * * * *